United States Patent
Larzelere

(10) Patent No.: US 9,211,015 B2
(45) Date of Patent: Dec. 15, 2015

(54) CHAIR WITH BALL-CASTERS

(71) Applicant: Michael Louis Larzelere, Port Huron, MI (US)

(72) Inventor: Michael Louis Larzelere, Port Huron, MI (US)

(*) Notice: Subject to any disclaimer, the term of this patent is extended or adjusted under 35 U.S.C. 154(b) by 0 days.

(21) Appl. No.: 14/455,925

(22) Filed: Aug. 10, 2014

(65) Prior Publication Data
US 2015/0042135 A1 Feb. 12, 2015

Related U.S. Application Data

(60) Provisional application No. 61/864,565, filed on Aug. 10, 2013.

(51) Int. Cl.
| *A47C 31/00* | (2006.01) |
| *A47C 7/00* | (2006.01) |
| *A47C 3/04* | (2006.01) |
| *B60B 33/08* | (2006.01) |

(52) U.S. Cl.
CPC . *A47C 7/006* (2013.01); *A47C 3/04* (2013.01); *B60B 33/08* (2013.01); *B60B 2200/22* (2013.01); *B60B 2900/212* (2013.01); *B60B 2900/3312* (2013.01)

(58) Field of Classification Search
CPC .................................. B60B 33/08; A45C 5/14
USPC .................. 297/463.1, 239; 16/24–28, 30, 43; 384/523, 531, 494, 569, 572
See application file for complete search history.

(56) References Cited

U.S. PATENT DOCUMENTS

| 34,833 | A | * | 4/1862 | Homes | 16/27 |
| 338,985 | A | * | 3/1886 | Lechner | 16/27 |
| 555,578 | A | * | 3/1896 | Marden | 16/25 |
| 581,216 | A | * | 4/1897 | Merl | 16/21 |
| 616,411 | A | * | 12/1898 | Dimmitt | 16/26 |
| 956,969 | A | * | 5/1910 | Hussey | 16/24 |
| 1,305,276 | A | * | 6/1919 | Gibson | 16/26 |
| 1,356,566 | A | * | 10/1920 | Smith | 16/26 |
| 1,445,747 | A | * | 2/1923 | Bryant et al. | 16/26 |
| 1,641,127 | A | * | 8/1927 | Denslow | 43/109 |
| 1,881,402 | A | * | 10/1932 | Graham | 16/24 |
| 2,423,711 | A | * | 7/1947 | Knox | 16/26 |
| 2,690,584 | A | * | 10/1954 | Freddolino | 16/26 |
| 3,381,330 | A | * | 5/1968 | Aninger | 16/21 |
| 3,445,882 | A | * | 5/1969 | Miano | 16/21 |
| 3,466,697 | A | * | 9/1969 | Goodrich et al. | 16/26 |
| 4,057,288 | A | * | 11/1977 | Schwartz et al. | 297/239 |
| 4,400,032 | A | * | 8/1983 | dePolo | 297/344.24 |
| 5,068,943 | A | * | 12/1991 | Estkowski et al. | 16/18 A |
| 7,305,737 | B2 | * | 12/2007 | Libakken | 16/35 R |
| 7,552,508 | B2 | * | 6/2009 | Underwood | 16/31 R |
| 7,578,028 | B2 | * | 8/2009 | Sellars | 16/20 |
| 7,610,655 | B2 | * | 11/2009 | Thaw et al. | 16/42 R |
| 8,196,944 | B1 | * | 6/2012 | Vondrak | 280/250.1 |
| 2002/0070514 | A1 | * | 6/2002 | Costa et al. | 280/11.226 |
| 2003/0131444 | A1 | * | 7/2003 | Koguchi | 16/24 |
| 2010/0194160 | A1 | * | 8/2010 | Machael et al. | 297/239 |

FOREIGN PATENT DOCUMENTS

DE 2348503 * 4/1975 ............ B60B 33/08

* cited by examiner

*Primary Examiner* — Laurie Cranmer
(74) *Attorney, Agent, or Firm* — Robert Gray; The Gray Law Group, Ltd.

(57) ABSTRACT

A chair is mounted on ball-casters. Each leg of the chair is mounted on a caster wheel that is surrounded by a ring of small metal balls, such as ball bearings, enabling the chair to roll freely without scuffing or scratching the floor or dulling the floor polish, and making it virtually impossible for the occupant to lean back in the chair with any stability.

10 Claims, 1 Drawing Sheet

CHAIR WITH BALL-CASTERS

CROSS-REFERENCE TO RELATED APPLICATIONS

This application claims the benefit of U.S. Provisional Application No. 61/864,565, filed on Aug. 10, 2013, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to commercial furnishings and in particular to a chair with ball-casters. Many large institutions such as schools, churches, and convention centers are challenged by the large numbers of occupants who must slide their chairs under a desk or table while sitting in their chairs, the sliding may cause scuff marks on the floor which may be difficult to remove. Occupants may also lean back in their chairs, further damaging the floors and creating risks of injury and liability for the institution if the chair tips over, causing a fall. A chair mounted on ball-casters is the solution. Each leg of the chair is mounted on a caster wheel that is surrounded by a ring of small metal balls, such as ball bearings, enabling the chair to roll freely without scuffing or scratching the floor or dulling the floor polish, and making it virtually impossible for the occupant to lean back in the chair with any stability.

SUMMARY OF THE INVENTION

Accordingly, the invention is directed to a chair mounted on ball-casters. Each leg of the chair is mounted on a caster wheel that is surrounded by a ring of small metal balls, such as ball bearings, enabling the chair to roll freely without scuffing or scratching the floor or dulling the floor polish, and making it virtually impossible for the occupant to lean back in the chair with any stability.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate three embodiments of the invention and, together with the description, serve to explain the principles of the invention.

DETAILED DESCRIPTION OF THE INVENTION

Figures 1, 2:
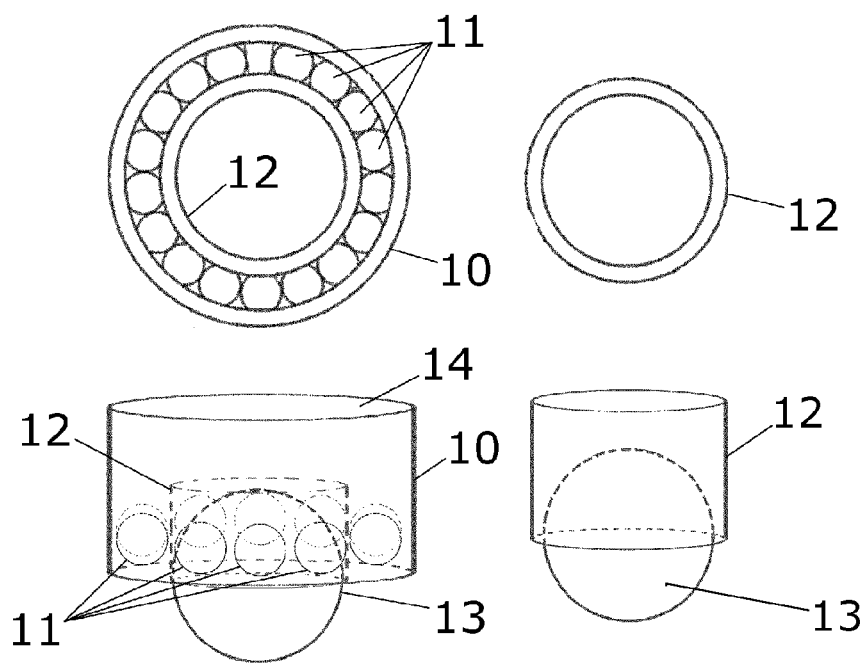
FIG. 1 shows a top view and front perspective view of a caster wheel and ring assembly of the first exemplary embodiment, displaying the outer housing 10, the ball bearings 11, the inner housing 12, the caster wheel 13, the cap 14, and the caster wheel and ring assembly 15.
FIG. 2 shows a top view and front perspective view of a caster wheel component of the first exemplary embodiment, displaying the inner housing 12, and the caster wheel 13.
Figure 3:
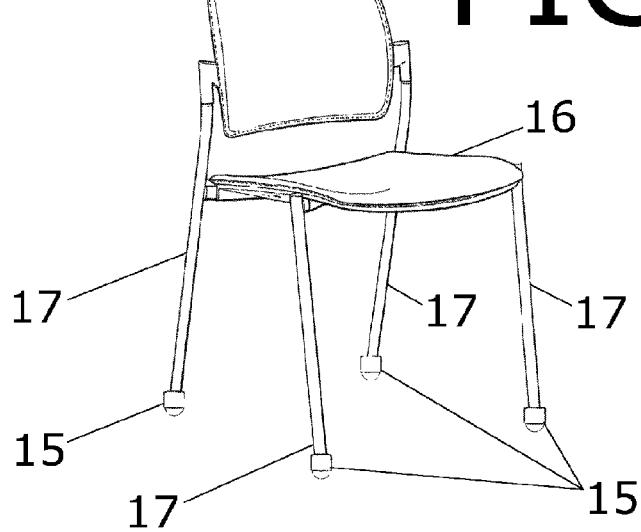
FIG. 3 shows a front perspective view of the first exemplary embodiment, displaying the caster wheel and ring assemblies 15, the chair 16, and the legs 17.

Referring now to the invention in more detail, the invention is directed to a chair mounted on ball-casters. Each leg 17 of the chair 16 is mounted on a caster wheel 13 that is surrounded by a ring of small metal balls, such as ball bearings 11, enabling the chair 16 to roll freely without scuffing or scratching the floor or dulling the floor polish, and making it virtually impossible for the occupant to lean back in the chair 16 with any stability.

The first exemplary embodiment preferably consists of a stackable plastic chair 16 mounted on four legs 17, each of which terminates at the lower end in a caster wheel and ring assembly 15. Each caster wheel and ring assembly 15 consists of two components: the caster wheel component, consisting of a cylindrical inner housing 12 and a caster wheel 13 with the caster wheel 13 being mounted freely rotatably within the inner housing 12, and the outer ring component, consisting of an outer housing 10, a plurality of ball bearings 11 or similar metal balls, and a cap 14. The cap 14 has a cylindrical interior; within the cap 14 the inner housing 12 is rotatably mounted within the ring of ball bearings 11. The lower end of the leg 17 is permanently affixed to the top of the cap 14 with welding, one or more bolts, one or more rivets, or another manufacturing process that is similarly sturdy and secure.

Caster wheel and ring assemblies 15 which are available separately as a kit and may be bolted on a pre-existing chair by the user as an after-market modification, are contemplated. Alternative embodiments of the device in which the chair 16 is not stackable and is manufactured from materials other than plastic, are also contemplated.

To use the first exemplary embodiment, the user rolls the chair 16 across the floor. The ball bearings 11 interact and cooperate with the caster wheels 13 in a manner than enables the chair 16 to roll smoothly across the floor without scraping or scuffing.

The outer housings 10, the ball bearings 11, the inner housings 12, the cap 14, and the legs 17 are preferably manufactured from rigid, durable metals such as steel and aluminum. The caster wheels 15 are preferably manufactured from a rigid, durable metal such as steel, encased in a flexible, durable, scuff resistant material such as silicone. The chair 16 is preferably manufactured from a rigid, durable material such as wood or high-impact plastic.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A caster wheel and ring assembly comprising a caster wheel; said caster wheel being spherical in shape; an inner housing; said inner housing being cylindrical in shape; said caster wheel being mounted freely rotatably within said inner housing; a cap; said cap having a cylindrical interior; a plurality of ball bearings; said plurality of ball bearings being disposed within said cap; said inner housing being rotatably mounted within said plurality of ball bearings within said cap.

2. The caster wheel and ring assembly of claim 1 further comprising a kit; said kit comprising said caster wheel, said inner housing, and said cap; said kit further comprising a means to attach said kit to a leg of a chair; said kit may be affixed to said leg of a chair on an aftermarket basis.

3. The caster wheel and ring assembly of claim 2 wherein said chair is made of rigid plastic.

4. Method of use of the caster wheel and ring assembly of claim 3 comprising sitting in said chair and moving said chair across a floor.

5. The caster wheel and ring assembly of claim 1 further comprising a chair; said chair having a plurality of legs; each of said plurality of legs terminating in and being affixed to said cap.

6. The caster wheel and ring assembly of claim 5 wherein said chair is stackable.

7. Method of use of the caster wheel and ring assembly of claim 6 comprising sitting in said chair and moving said chair across a floor.

8. The caster wheel and ring assembly of claim 5 wherein said chair is made of rigid plastic.

9. Method of use of the caster wheel and ring assembly of claim 8 comprising sitting in said chair and moving said chair across a floor.

10. Method of use of the caster wheel and ring assembly of claim 5 comprising sitting in said chair and moving said chair across a floor.

* * * * *